United States Patent
Werum et al.

(10) Patent No.: US 9,381,954 B2
(45) Date of Patent: Jul. 5, 2016

(54) BODY SUPPORTING STRUCTURE FOR A VEHICLE BODY

(71) Applicant: Audi AG, Ingolstadt (DE)

(72) Inventors: Daniel Werum, Neckarsulm (DE); Andreas Lehr, Heilbronn (DE); Peter Haffner, Barntrup (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/407,364

(22) PCT Filed: Jun. 13, 2013

(86) PCT No.: PCT/EP2013/001745
§ 371 (c)(1),
(2) Date: Dec. 11, 2014

(87) PCT Pub. No.: WO2013/185917
PCT Pub. Date: Dec. 19, 2013

(65) Prior Publication Data
US 2015/0123419 A1 May 7, 2015

(30) Foreign Application Priority Data

Jun. 13, 2012 (DE) .................. 10 2012 011 878

(51) Int. Cl.
*B60N 99/00* (2006.01)
*B62D 31/00* (2006.01)
(Continued)

(52) U.S. Cl.
CPC .......... *B62D 31/003* (2013.01); *B60H 1/00564* (2013.01); *B62D 25/04* (2013.01); *B62D 25/087* (2013.01); *B62D 25/20* (2013.01); *B62D 29/046* (2013.01)

(58) Field of Classification Search
CPC .... B62D 31/003; B62D 25/04; B62D 25/087; B62D 25/20; B62D 29/046; B60H 1/00564
See application file for complete search history.

(56) References Cited

U.S. PATENT DOCUMENTS

| 5,666,727 A | 9/1997 | Rashid |
| 6,073,991 A | 6/2000 | Naert |

(Continued)

FOREIGN PATENT DOCUMENTS

| CN | 1096258 A | 12/1994 |
| CN | 1958347 A | 5/2007 |

(Continued)

OTHER PUBLICATIONS

International Search Report issued by the European Patent Office in International Application PCT/EP2013/001745 on Jul. 16, 2013.

(Continued)

*Primary Examiner* — Lori L Lyjak
(74) *Attorney, Agent, or Firm* — Henry M. Feiereisen LLC.

(57) ABSTRACT

A body supporting structure for a vehicle body has a passenger-compartment section, a front-structure section and a rear-structure section. In order to form the body supporting structure, at least one supporting-structure body is configured as a three-dimensional flat structure which extends in all vehicle directions (x, y, z direction) and includes flat elements, the flat elements which extend in different vehicle directions (x, y, z direction) are connected with the formation of soft transitions, the flat elements are configured with cross-sectional areas which are structured depending on the applied loads, and flat elements with low applied loads or non-loadbearing regions are configured with apertures.

25 Claims, 7 Drawing Sheets

(51) Int. Cl.
  *B62D 29/04* (2006.01)
  *B60H 1/00* (2006.01)
  *B62D 25/04* (2006.01)
  *B62D 25/08* (2006.01)
  *B62D 25/20* (2006.01)

(56) References Cited

U.S. PATENT DOCUMENTS

| | | | |
|---|---|---|---|
| 8,652,611 B2 | 2/2014 | Gaudig et al. | |
| 2009/0206632 A1* | 8/2009 | Biersack | B62D 21/07 296/193.7 |
| 2009/0243343 A1* | 10/2009 | Tamakoshi | B62F 25/04 296/204 |
| 2010/0078968 A1* | 4/2010 | Boettcher | B65D 33/023 296/193.07 |
| 2012/0104803 A1 | 5/2012 | Thomas et al. | |

FOREIGN PATENT DOCUMENTS

| | | |
|---|---|---|
| DE | 198 16 034 | 10/1999 |
| DE | 102009052920 | 6/2010 |
| DE | 102009040934 | 3/2011 |
| DE | 102010014574 | 10/2011 |
| EP | 0 670 257 | 9/1995 |
| EP | 1 781 527 | 11/2007 |
| WO | WO 03/057529 | 7/2003 |
| WO | WO 2005/056372 | 6/2005 |
| WO | WO 2006/011057 | 2/2006 |
| WO | WO 2009/077540 | 6/2009 |

OTHER PUBLICATIONS

Chinese Search Report issued on Jan. 19, 2016 with respect to counterpart Chinese patent application 201380031023.2.
Translation of Chinese Search Report issued on Jan. 19, 2016 with respect to counterpart Chinese patent application 201380031023.2.

* cited by examiner

BODY SUPPORTING STRUCTURE FOR A VEHICLE BODY

CROSS-REFERENCES TO RELATED APPLICATIONS

This application is the U.S. National Stage of International Application No. PCT/EP2013/001745, filed Jun. 13, 2013, which designated the United States and has been published as International Publication No, WO 2013/185917 and which claims the priority of German Patent Application, Serial No. 10 2012 011 878.3, filed Jun. 13, 2012, pursuant to 35 U.S.C. 119(a)-(d).

BACKGROUND OF THE INVENTION

The invention relates to a body supporting structure for a vehicle body having a passenger compartment section, a front-structure section and a rear-structure section.

The existing state of the art for manufacturing vehicle bodies has long been a unitary body shell construction, in which, by using different joining techniques, profiles, frame parts, reinforcements, sheet metal parts and skins are permanently connected with one another as steel elements and sheet metal elements and form a body-supporting structure. This category also includes the so-called monocoque construction, which is used primarily in motor sport. For example, a single-shell outer skin forms here the supporting structure of a vehicle; driver compartments are also produced using this monocoque construction as a monocoque shells and connected to the body.

A new lightweight design concept in body construction was introduced by the applicant in form of the so-called Audi Space Frame (ASF). Here, a unitary body is formed of die-cast aluminum, aluminum profiles and aluminum sheet, into which the load-bearing flat elements are integrated.

In these concepts, to optimize the crash performance, longitudinal beam structures which are connected via cross-beam support structures to provide reinforcement and support, for example, by way of cast nodes (see ASF-concept), are optimized as main load paths with regard to occurring load situations. Single load path structures are also designed to receive individual loads, such as crash loads, introduced undercarriage loads or stiffness-enhancing loads. Crash energy is dissipated by wrinkling of the employed metallic material used in these load paths.

In the context of lightweight concepts, body parts are increasingly constructed as hybrid components from a combination of metal and fiber-reinforced plastic (FRP) or as a plastic component made of a FRP material.

For example, a body-supporting structure is known from EP 1 781 527 B1 which has a modular structure constructed as a central body section with the passenger compartment and a front body section. The central body section is produced as a support frame from aluminum profiles and connected to a base plate. Both the base plate and the front body section are made from a fiber composite material, such as carbon fibers, Kevlar fibers and/or glass fibers. According to EP 1 781 527 B1 it is also proposed to likewise produce the central body partially or completely from a fiber composite material.

DE 10 2010 014 574 A1 discloses a vehicle body of modular construction, which also consists of a unitary passenger compartment and a front- and rear-structure section attached thereto, wherein the passenger compartment includes a trough-shaped bottom section made of fiber-reinforced plastic with a front wall and a rear wall. The front-structure section and the rear-structure section are attached to this front wall and rear wall with screws.

Although energy absorbing elements made of a fiber composite material have a higher specific energy absorption capability than metallic longitudinal or transverse beams, such structures made of fiber-reinforced plastic exhibit an unfavorable crash behavior, since these structures dissipate crash energy in a progressive compression process (crushing) which causes their complete destruction, so that the residual strength is not sufficient to hold the attached structural elements together.

It is also known to take nature as a model for lightweight structures and to replicate nature as a bionic design, which is intended for maximum weight savings while providing optimal stability.

Such a concept was pursued by Daimler AG in the development of a concept vehicle, referred to as "Bionic Car". This vehicle was constructed with an optimized basic structure inside an optimal aerodynamic shell, with a boxfish used as a fluid dynamics model. This optimized basic structure was developed by using software simulating a bone mineralization process, which produces load-oriented structural proposals for technical components. However, this Bionic Car concept was not produced in series.

Furthermore, it is also known to develop vehicle body parts with an optimal bionic design, as described for example in DE 10 2009 052 920 A1 in relation to a subcarrier to be attached to a vehicle body.

SUMMARY OF THE INVENTION

It is the object of the invention to create a body supporting structure for a vehicle body which has at least partially an optimized bionic structure, and in particular an optimized crash performance.

This object is solved by a vehicle body supporting structure for a vehicle body having a passenger compartment section, a front-structure section and a rear-structure section.

Such a body supporting structure for a vehicle body with a passenger compartment section, a front-structure section and a rear-structure section, is characterized according to the invention in that to form the body supporting structure, at least one structural supporting member is formed from flat elements as a three-dimensional surface structure extending in all directions of the vehicle, the flat elements extending in different directions of the vehicle are interconnected by smooth transitions, the flat elements are formed with cross-sectional areas that are structured depending on the occurring applied loads, and the flat elements with low applied loads or non-loadbearing regions are formed with openings.

Such an inventive structural supporting member thus represents a surface supporting structure extending in quasi all three spatial directions and which is self-supporting and hence distributes applied loads in all spatial directions, wherein depending on the occurring applied loads the cross-sectional areas are structured in such a way that large applied loads result in large surface cross-sections.

By employing such a supporting surface structure, the usual nodes connecting the longitudinal and transverse beams are removed and the longitudinal and transverse structures are seamlessly joined by smooth transitions, i.e. without the formation of sharp edges. Thus, there are no sharp edges in the load paths, thus preventing peak stresses. Detrimental separation lines or joints are also eliminated. Furthermore, such a supporting surface structure forms homogeneous load paths, thus preventing peak stresses under an applied force. Single supports acting only in one spatial direction are also no longer required.

Overall, such a structural supporting member according to the invention produces a structure having high stability while minimizing material consumption.

According to another advantageous embodiment of the invention, a floor assembly with a common trough-like subfloor for the passenger compartment section and a front-structure section with a trough bottom and trough side members is provided as a supporting structural member, wherein the trough bottom is symmetrically recessed in the region of the front-structure section relative to the region of the passenger compartment section with a smaller width in the transverse vehicle direction and the bottom assembly is formed with the trough side members surrounding the entire horizontal contour of the trough bottom and extending substantially in the vertical direction of the vehicle.

Such floor assembly has neither longitudinal nor transverse beams; forces of an applied front load are homogeneously introduced into the surface area of the floor assembly, i.e., in particular in the trough bottom, where they are distributed. The forces acting in the event of a side crash are homogeneously distributed in the floor assembly in the same manner.

Advantageously, the trough side members of the passenger compartment section running in the longitudinal vehicle direction are formed in the vertical vehicle direction at a rocker panel height of the vehicle. This defines at the same time the door openings without necessitating any additional parts.

According to another embodiment, however, the trough side members of the floor assembly are elevated in the area of the front-structure section relative to the rocker panel height in the vertical vehicle direction. This ensures a high stability of the front-structure section, and more particularly, forces can be introduced there via other attached structural supporting members, which are then also distributed in the floor assembly. Accordingly, openings for front axles can be accommodated in these trough side members, which extend in the longitudinal vehicle direction, in the region of front-structure section.

According to another embodiment of the invention, the front-structure trough side member has in the transverse vehicle direction at least one opening for a cooling air supply, where the radiator grille with refrigeration units can be arranged in a space-saving manner.

In one embodiment of the invention, the subfloor is formed in the region of the transition of the passenger compartment section to the front-structure section with a raised portion having a cross sectional area in the transverse vehicle direction that is greater than the cross-sectional area of the trough bottom in the region of the passenger compartment section.

In this way, a high stability is achieved in the transverse vehicle direction in the front-structure section of the passenger compartment section of the vehicle body, so that large load forces are homogenously introduced into the subfloor via this raised portion.

Particularly advantageously, the trough bottom in the region of the front-structure section may be formed with an obtuse angle of at least 135° relative to the trough bottom in the area of the passenger compartment section. Advantageously, this positively affects the drag coefficient ($c_w$-value).

In another advantageous embodiment of the invention, the front-structure section may have as structural supporting member a front-structure cell with two front-structure side members oriented in the vertical vehicle direction which are each formed in the longitudinal vehicle direction and which extend, starting from the end region of the passenger compartment section of the contour of the front-structure trough side member, which extends in the transverse vehicle direction; furthermore, the front-structure side members are each formed at the front end of the passenger compartment section with a lower A-pillar section, and a flat element located at the transition of the passenger compartment section to a front-structure section and connecting the front-structure side members is provided as a front wall.

This produces a stable and weight-optimized front end in conjunction with the subfloor. A positive connection across an area between the front-structure side members and the trough side members of the subfloor is achieved by an end-side connection.

Advantageously, in this front-structure cell, the respective upper ends of the two front-structure side members are each provided with a transitional front-structure flat element extending in the longitudinal vehicle direction and in the transverse vehicle direction, such that for forming a wheel housing its outer boundary edge is aligned in the region of the passenger compartment section with the contour of the trough side member. Preferably, the two front-structure flat elements are formed to transition into each other in the region of the flat element forming the front wall of the passenger compartment section.

Such a front-structure cell can accommodate all necessary drive and suspension components without necessitating additional vehicle body parts.

According to another embodiment, the front-structure cell may be formed on both sides of its front end with a receiving chamber having an open front, wherein the front-structure side members and the front-structure flat elements each form a side wall of the receiving chamber. In this way, all necessary front lighting components can be accommodated by this receiving chamber of the front-structure cell.

According to another embodiment of the invention, a seat element extending substantially in the horizontal direction may be formed on the rear trough side member of the passenger compartment section extending in the transverse vehicle direction for supporting a backseat, wherein the seat element is connected to a flat seatback element extending substantially in the vertical vehicle direction. Preferably, the seat element and the flat seatback element have an angular position relative to one another with an angle that corresponds substantially to the angle between the seat element and the backrest of the backseat.

According to another embodiment, a particularly stable and crash-proof floor assembly is furthermore formed by extending the subfloor, starting from the rear trough side section in the rearward direction by way of outside side tunnels, such that the outside tunnel walls of the side tunnels are aligned with the respective trough side member in the region of the passenger compartment section. Preferably, the side tunnel is formed with a bottom tunnel wall that is substantially aligned with the trough bottom, whereas the top side tunnel wall is formed so as to be substantially aligned with the first surface section of the rear trough side member of the subfloor.

Furthermore, according to another embodiment of the invention, the two side tunnels are formed so as to terminate frontally in the plane of the rear trough side member. Preferably, the two inner tunnel side walls of the side tunnels aligned in the vertical vehicle direction are constructed to introduce a grid-like pattern in the rear trough side member. The rigidity in this area is improved by connecting the side tunnel to the rear trough side section, whereby less material is required concurrent with the grid-like structure of the trough side member.

According to a preferred embodiment of the invention, the rear-structure section includes a subfloor rear-structure section as a supporting structural member, which has a bottom member rearwardly continuing the trough bottom in the area of the passenger compartment bottom section and side members that are stepwise matched to the outer shape of the side tunnel in the transverse vehicle direction. This allows rear axle units to be connected to this subfloor rear member. Preferably, the side members of the rear-structure subfloor section are each formed so as to transition to a flat element forming an inner wall of the wheel housing.

According to an advantageous embodiment of the invention, the rear-structure section forming a further structural supporting member may include a storage space cell with a storage space cell bottom having formed thereon storage space cell side walls and a molded front end wall. In this case, this end wall is constructed so as to be aligned with the seat-back flat element.

The rear-structure section thus includes only a few structural supporting members for forming the body supporting structure.

According to an embodiment of the invention, a roof structure may be formed in each case by a curved truss connecting the lower A-pillar section with the front wall of the storage space cell, wherein in each case a B-pillar element connects the truss to the trough side section of the trough bottom. Preferably, two spaced transverse elements connecting the truss in the transverse vehicle direction are provided, which receive a roof area element between them.

To complete the body supporting structure, a side member covering the outside of the lower A-pillar section, the truss, the B-pillar section and a side wall of the storage space cell is provided as a supporting structural member.

The structural supporting members according to the invention may each be produced as fiber plastic composites entirely of fiber-reinforced plastic. Suitable processes are for example:
  RTM (Resin Transfer Molding) as high-pressure RTM or low-pressure RTM,
  RIM (Resin Injection Molding),
  Prepreg Autoclave or Prepreg Out-of-Autoclave,
  Wet pressing,
  SMC (Sheet Molding Compound) or BMC (Bulk Molding Compound).

It is also possible to use structural foams for the structural supporting members according to the invention, wherein the foams are either introduced into the cavities of the structural supporting members or as finished components into the structural supporting members.

The structural supporting members are connected by way of adhesive connections.

Preferably, these structural supporting members may also be made of aluminum sheet or steel sheet by suitable forming processes, using structural foams like in the manufacture of the structural supporting members.

The body supporting structure according to the invention is particularly suited for vehicle bodies of electric vehicles, where a large internal combustion engine can be omitted.

BRIEF DESCRIPTION OF THE DRAWING

The invention will now be described in detail by way of an exemplary embodiment and with reference to the accompanying drawings, which show in.

DETAILED DESCRIPTION OF PREFERRED EMBODIMENTS

Figure 1:
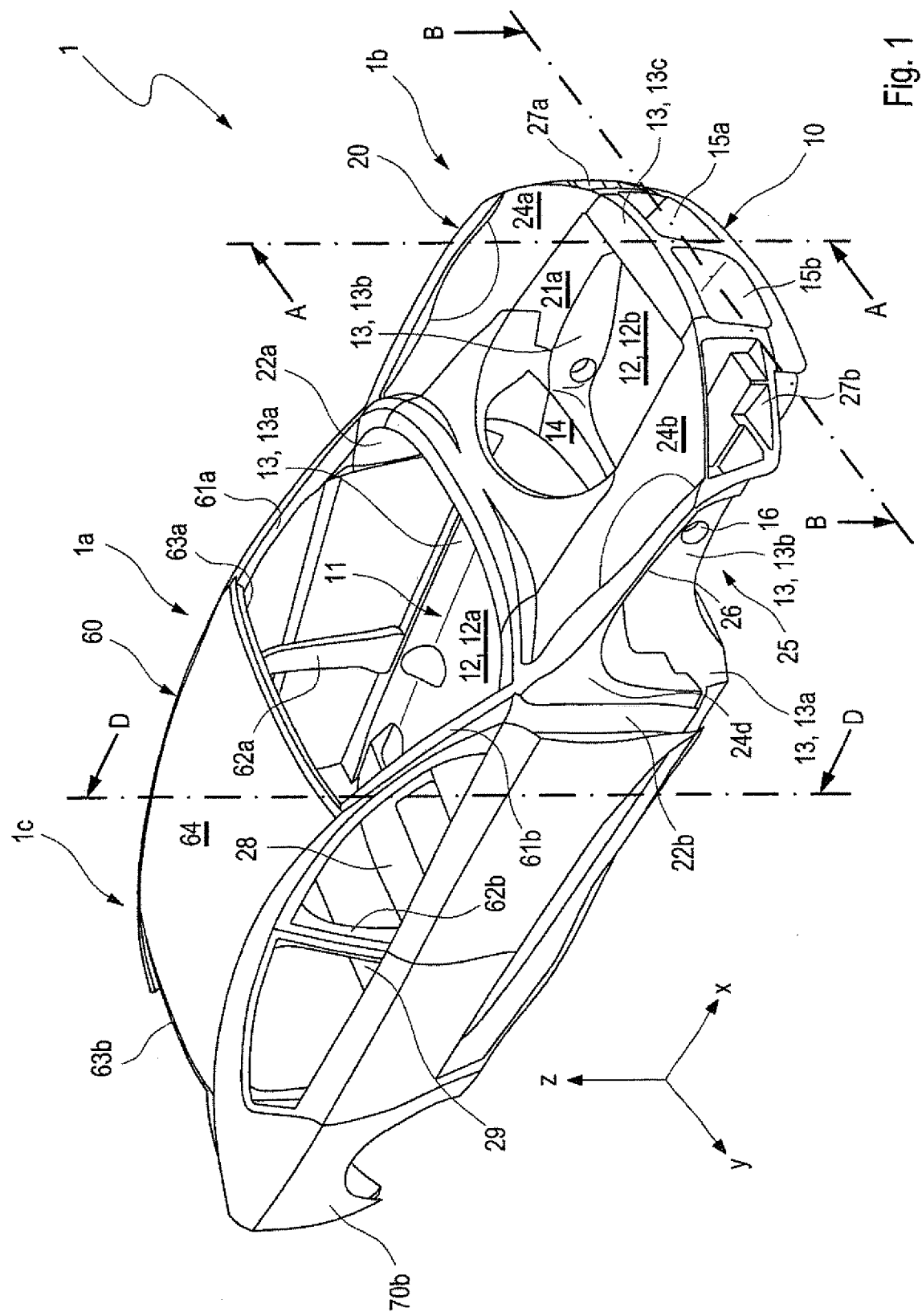
FIG. 1 a front perspective view of a body supporting structure according to the invention, FIG. 2 a rear perspective view of the body supporting structure according to FIG. 1, FIG. 3 a perspective view of a floor assembly of the body supporting structure according to FIG. 1 with a front-structure cell and a storage space cell, FIG. 4 a perspective sectional view of the body supporting structure sectioned along the line A-A of FIG. 1, FIG. 5 a perspective sectional view of the body supporting structure sectioned along the line B-B of FIG. 1, FIG. 6 a perspective sectional view of the body supporting structure sectioned along the line C-C of FIG. 2, and FIG. 7 a perspective sectional view of the body supporting structure sectioned along the line D-D of FIG. 1.
Figure 2:
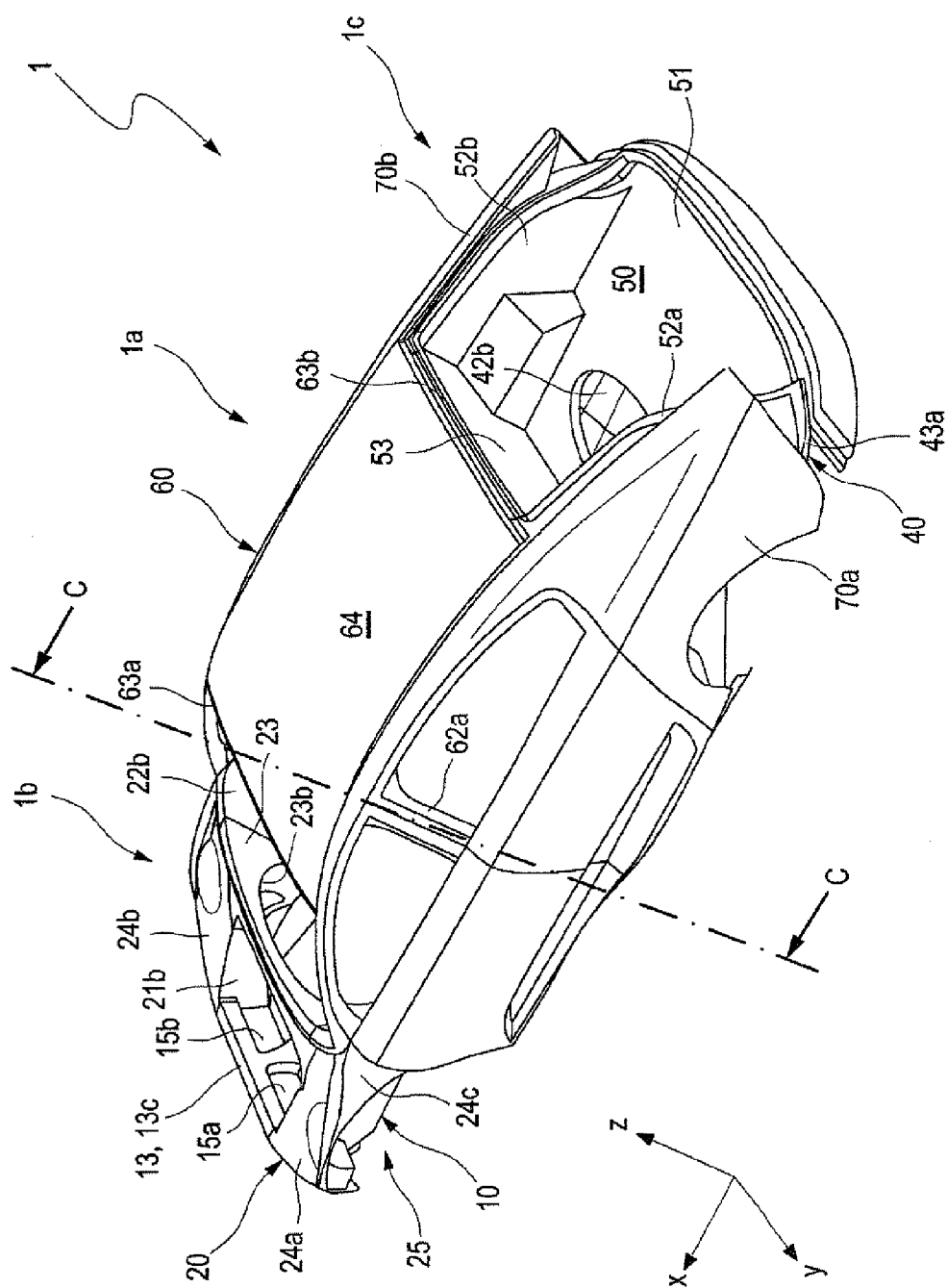

The body supporting structure 1 of a vehicle body illustrated in FIGS. 1 and 2 includes a passenger compartment section 1a, a front-structure section 1b, and a rear-structure section 1c and is constructed from a plurality of structural supporting members. In addition, vehicle doors, which are omitted in the subsequent FIGS. 3 to 7, are already installed in this body supporting structure 1 according to FIGS. 1 and 2.

The body supporting structure 1 includes as structural supporting members a floor assembly 10, a front-structure cell 20, a subfloor rear-structure section 40, a storage space cell 50 as well as side members 70a and 70b.

These structural supporting members represent a flat supporting structure composed of flat elements and extending in all three vehicle directions, namely the x-, y- and z-direction, which is self-supported so that applied loads are distributed in all spatial directions. Such structural supporting members eliminate the customary nodes connecting the longitudinal and transverse beams and seamlessly join the longitudinal and transverse structures by way of soft transitions without sharp edges. Thus, there are neither sharp edges in the load paths nor undesirable partitions or joints. Homogeneous load paths are hence formed in such a structural supporting member, i.e. locally applied loads spread immediately to the flat elements and are distributed in the spatial structure of the body supporting structure.

Such structural supporting members 10, 20, 40, 50, and 70a and 70b are entirely made of a fiber composite material.

Hereinafter, these structural supporting members 10, 20, 40, 50, and 70a and 70b, and additional elements completing the body supporting structure 1 will be described below.

Figure 4:
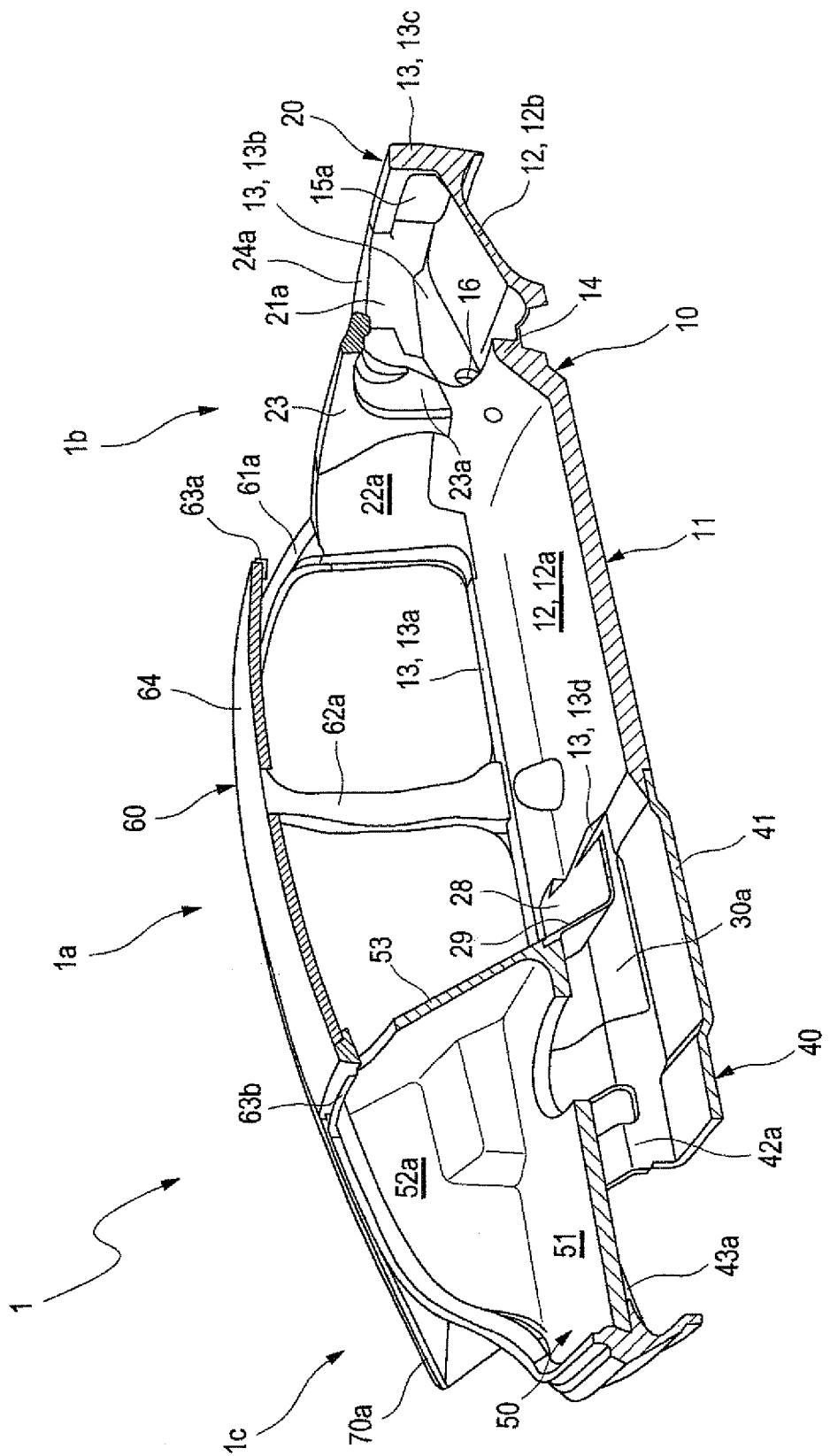
Figure 5:
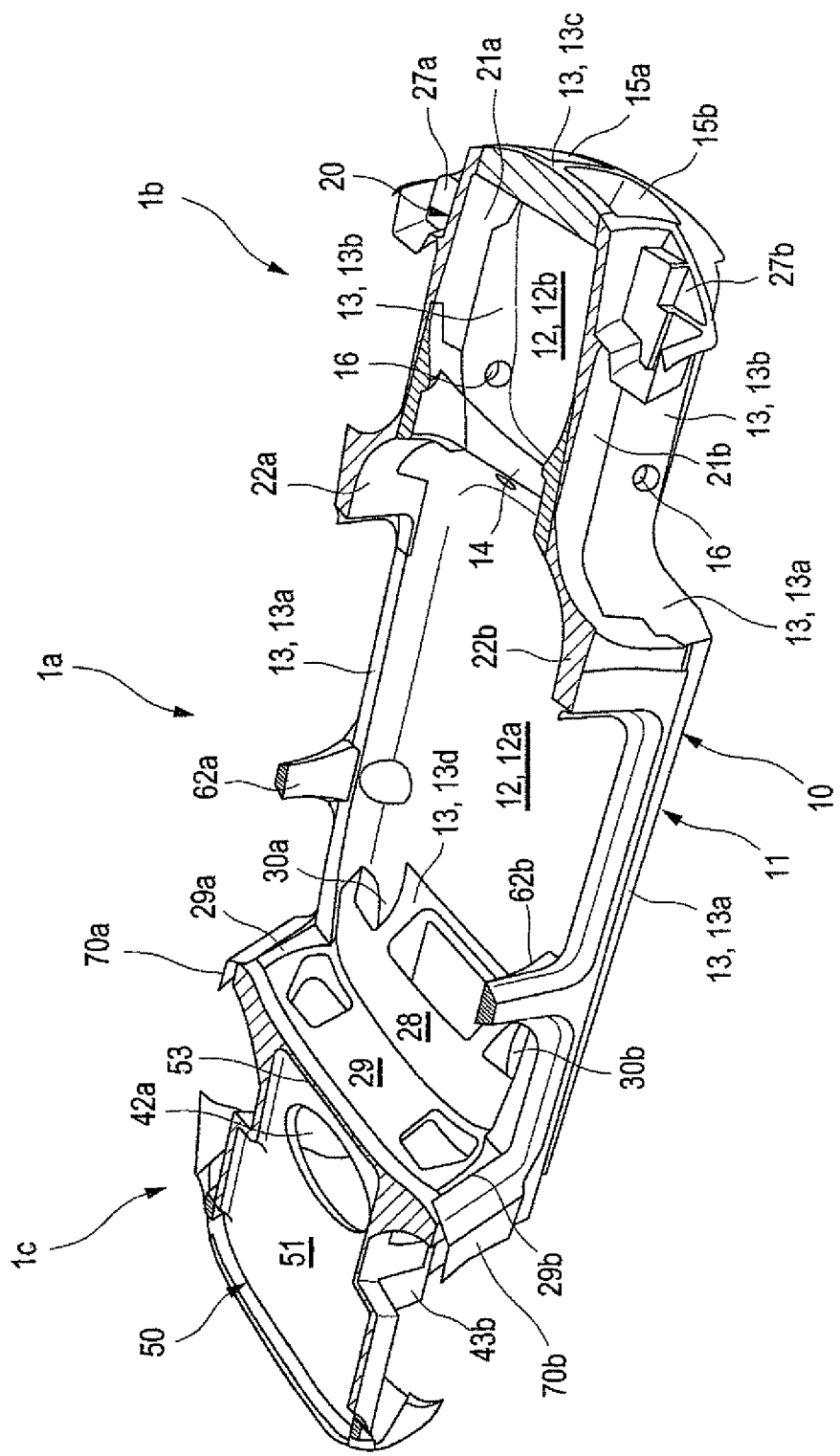
Figure 6:
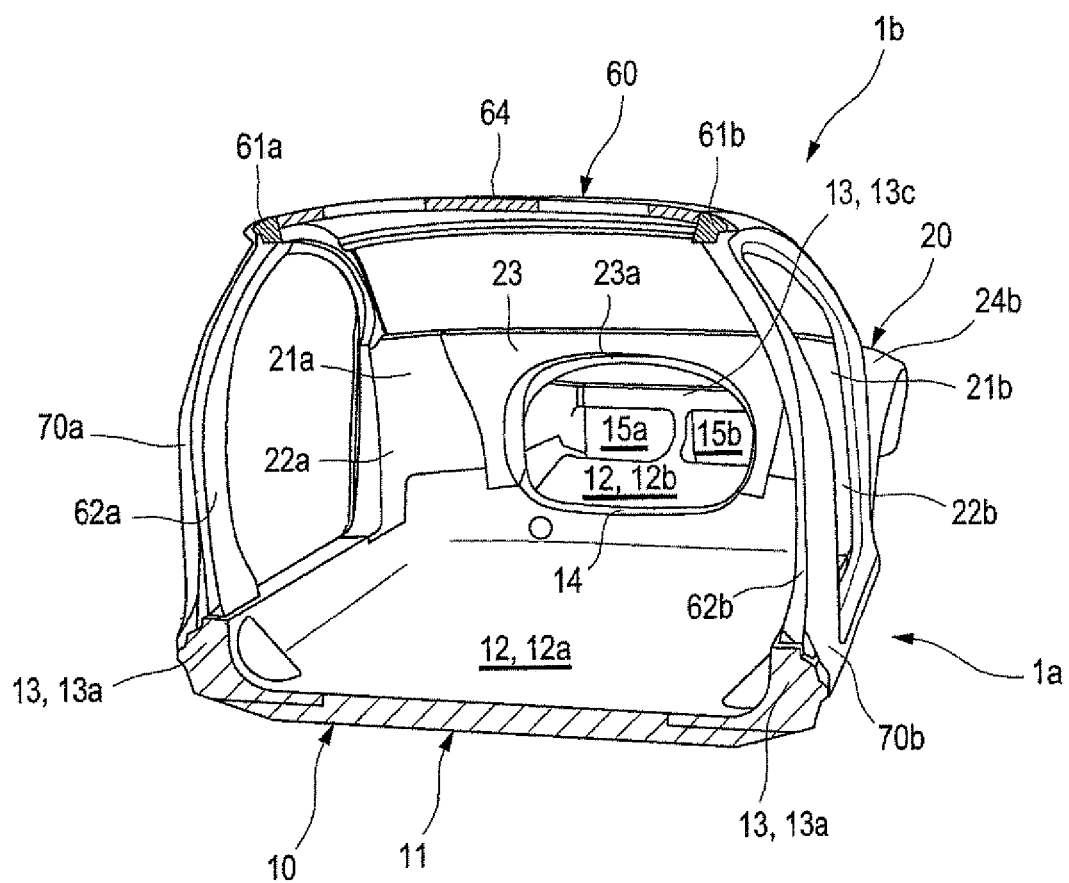
Figure 7:
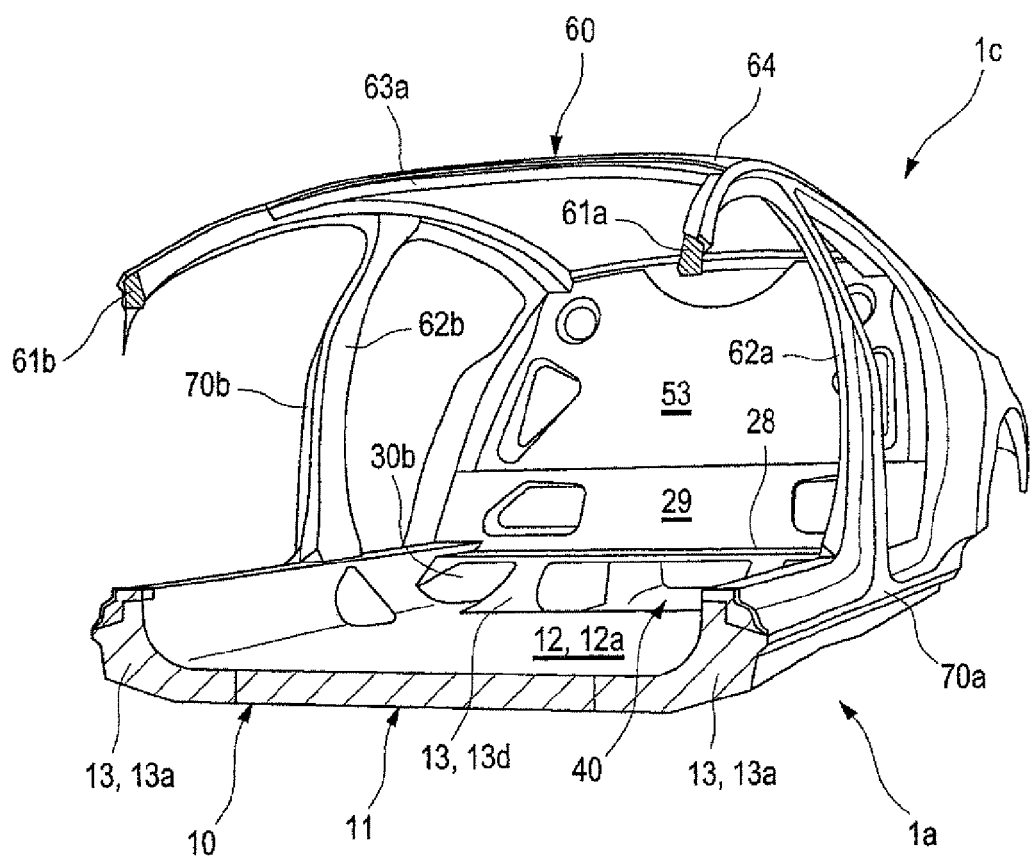

The floor assembly 10 includes as an essential component a subfloor 11 which extends both across the passenger compartment section 1a and across the front-structure section 1b, and which is illustrated as the structural supporting member 10, in particular in the sectional views of FIGS. 4 and 5, and a subfloor rear member 40 which continues the subfloor 11 in the rearward direction of the body supporting structure 1 according to FIG. 4.

This subfloor 11 is made of a trough bottom 12 with a circumferential trough side sections 13 substantially extending in the z direction. This trough bottom 13 thus represents a flat element, which continues in the z-direction with the trough side members 13 as additional flat elements. In the region of the front-structure section 1b, the trough bottom 12b is symmetrically recessed in the y-direction relative to the trough bottom 12a in the region of the passenger compartment section 1a. The trough side members 13a in the region of the passenger compartment section 1a transition in this transition region harmoniously into the trough side members 13b of the front-structure section 1b.

The upper end sides of the trough side members 13a in the region of the passenger compartment section 1a have a height that corresponds to the rocker panel height of the vehicle body. In the transition region from the passenger compartment section 1a to the front-structure section 1b, this rocker panel height of the trough side members 13a increases to a much higher value of the height of the upper end of the trough side members 13b in the region of the front-structure section 1b. As a result, openings 16 for receiving the front axles may be provided at that location.

The front-structure trough side member 13c extending in the y-direction is structured in the center with a rib extending in the z-direction, creating two openings 15a and 15b for supply of cooling air.

The trough bottom 12b in the region of the front-structure section 1b is slightly angled relative to the trough bottom 12a in the region of the passenger compartment section 1a in the z-direction with an obtuse angle of at least 135°.

The front end of the trough bottom 12a belonging to the passenger compartment section 1a is formed with a raised portion 14 located opposite the trough bottom 12a and extending in the z-direction, thereby forming a region reinforcing the trough bottom 12 with a larger cross-section in the transverse vehicle direction than in the adjacent regions of the trough bottom 12a and 12b. An opening for passage of a steering column can be applied in this area.

For supporting a backseat, a flat seat element 28 extending substantially horizontally (x-y plane) is formed on the rear trough side member 13d of the passenger compartment section 1a running in the y-direction, which is connected to a flat seatback element 29 extending substantially in the z-direction. The seat element 28 and the flat seatback element 29 have an angular position relative to each other with an angle that corresponds substantially to the angle between the seat and the backrest of the backseat.

The subfloor 11 of the floor assembly 10 is extended from the rear trough side member 13d in the reverse direction by way of side tunnels 30a and 30b arranged on the outside, so that the outside tunnel walls of the side tunnels 30a and 30b are aligned with the respective trough side member 13a in the region of the passenger compartment section 1a, the bottom tunnel walls of the two side tunnels 30a and 30b are aligned with the trough bottom 12a, and the upper tunnel walls of the two side tunnels 30a and 30b are aligned with the seat member 28 of the rear side of the trough side member 13d.

The two side tunnels 30a and 30b end at the front side in the plane of the rear trough side member 13d, wherein the two inside tunnel side walls of the side tunnels 30a and 30b aligned in the z direction form the rear trough side member 13d with a grid-like structure, creating three openings.

As another structural supporting member, a front-structure cell 20 having two front-structure side members 21a and 21b facing each in the z direction is provided in the region of the front-structure section 1b, which are formed in the x direction, starting from the end region of the passenger compartment section 1a with the trough side member 13a, transitioning into the trough side member 13b in the region of the front-structure section 1b, and ending at the trough side member 13b that runs in the y-direction. At the transition from the passenger compartment section 1a to the front-structure section 1b, i.e. at the front end of the passenger compartment section 1a, front-structure side members 21a and 21b are formed as a lower A-pillar section 22a and 22b, wherein a flat element connecting the front-structure side members 21a and 21b is formed at the transition from the passenger compartment section 1a to the front-structure section 1b as an end wall 23 with an opening 23b. These front-structure side members 21a and 21b form fittingly abut the trough side members 13a and 13b.

The two front-structure side members 21a and 21b of the front-structure cell 20 are each constructed to transition at their upper end into a flat element 24a and 24b extending in the x- and y-direction, so that for forming a wheel housing 25, their outside free boundary edge 26 is aligned with the contour of the trough side member 13a in the region of the passenger compartment section 1a. A respective flat element 24a and 24b each covers the corner region between the front-structure flat element 24c and 24d, so that an arc-shaped profile of the parts forming the wheel housing 25 is produced by the contour and the boundary edge 26.

Furthermore, the two front-structure flat elements 24a and 24b are formed in the region of the flat elements forming the end wall 23 so as to transition into one another, so that a circular-arc-like opening for an engine hood is formed in the plane of the two front-structure flat elements 24a and 24b.

Finally, the front-structure cell 20 is provided at its front end on both sides with a receiving chamber 27a and 27b open at the front, so that the front-structure side members 21a and 21b and the front-structure flat elements 24a and 24b each form a side wall of the receiving chamber 27a and 27b, respectively.

The upper end face of the end wall 23 has a curved profile in the forward direction such that the end wall 23 is bridged at the end face in a sector-like fashion by a flat element 23a.

As an additional structural supporting member, a subfloor rear member 40 is arranged in the region of the rear-structure section 1c, which has a bottom part 41 rearwardly extending the trough bottom 12a in the region of the passenger compartment section 1a, as well as side members 42a and 42b. The side members 42a and 42b are stepwise adapted in the y-direction to the outer shape of the side tunnels 30a and 30b and are each formed as a flat element transitioning into a respective wheel housing inner wall 43a and 43b.

Figure 3:
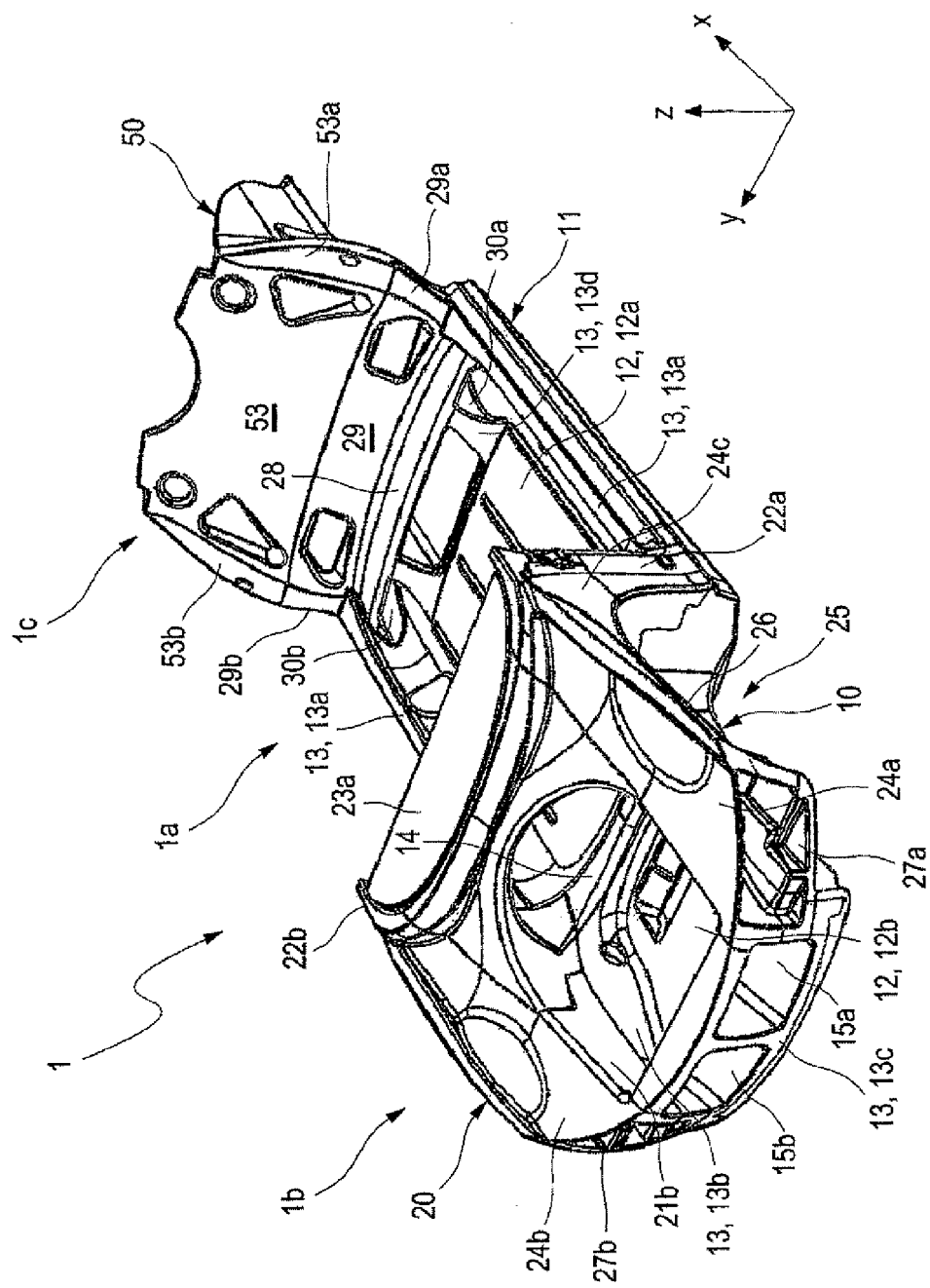

The rear-structure section 1c further includes as another structural supporting member a storage space cell 50, which has a storage space cell bottom 51 extending substantially in the x-y plane with storage space cells side walls 52a and 52b molded thereto and extending in the z-direction, and a front end wall 53 molded thereto, whereby this end wall 53 is substantially aligned in the z-direction with the flat seatback element 29, as evident from FIGS. 3 and 4. The edge reinforcements 29a and 29b of the flat seatback element 29 here transition into corresponding edge reinforcements 52a and 52b.

To form a roof structure 60 of the body supporting structure 1, a respective truss 61a and 61b connecting the lower A-pillar section 22a and 22b in an arcuate manner with the end wall 53 of the storage space cell 50 is provided on both sides, so that in each case a respective B-pillar element 62a, 62b connects the truss 61a and 61b, respectively, with the trough side member 13a of the trough bottom 12 in the region of the passenger compartment section 1a. Furthermore, a roof area element 64 is also provided, which is received between two spaced-apart transverse elements 63a and 63b connecting the trusses 61a and 61b in the y-direction.

Finally, as a last structural supporting member, a respective side member 70a and 70b is provided which each covers the outside of the lower A-pillar section 22a and 22b, the truss 61a and 61b, the B-pillar member 62a and 62b, and a storage space cell side wall 52a and 52b of the storage space cell 50.

For constructing the body supporting structure 1 (without the vehicle doors), the individual structural supporting members made of a fiber-reinforced plastic are connected with each other by an adhesive joint.

REFERENCE SYMBOLS 1 body supporting structure
1a passenger compartment section
1b front-structure section
1c rear-structure section
10 structural supporting member, floor assembly
11 subfloor of the floor assembly 10
12 trough bottom of the subfloor 11
12a trough bottom in the region of the passenger compartment section 1a
12b trough bottom in the region of the front-structure section 1b
13 trough side members of the subfloor 11
13a trough side members of the passenger compartment section 1a
13b trough side members in the region of front-structure section 1b
13c front-structure trough side member of the front-structure section 1b
13d rear trough side member of the passenger compartment section 1a
14 raised portion
15a opening in the trough side member 13c
15b opening in the trough side member 13c
16 openings in the trough side member 13b
20 structural supporting member, front-structure cell
21a front-structure side member of the front-structure cell 20
21b front-structure side member of the front-structure cell 20
22a lower A-pillar section of the front-structure side member 21a
22b lower A-pillar section of the front-structure side member 21b
23 end wall of the front-structure cell 20
23a flat element of the front-structure cell 20
23b opening of the front wall 23
24a front-structure flat element of the front-structure cell
24b front-structure flat element of the front-structure cell
24c flat element of the front-structure cell 20
24d flat element of the front-structure cell 20
25 wheel housing
26 boundary edge of the front-structure flat element 24a, 24b
27a receiving chamber of the front-structure cell
27b receiving chamber of the front-structure cell
28 seat element of the trough side member 13d
29 flat seatback element
29a edge reinforcement of the seat backrest flat element 29
29b edge reinforcement of the seat backrest flat element 29
30a side tunnel of the floor assembly 10
30b side tunnel of the floor assembly 10
40 supporting structural member, subfloor rear member
41 bottom part of the subfloor rear member 40
42a side member of the subfloor rear member 40
42b side member of the subfloor rear member 40
43a wheel housing inner wall of the side member 42a
43b wheel housing inner wall of the side member 42b
50 structural supporting member, storage space cell
51 storage space cell bottom of the storage space cell 50
52a storage space cell side wall of the storage space cell 50
52b storage space cell side wall of the storage space cell 50
53 front wall of the storage space cell 50
53a edge reinforcement of the front wall 52
53b edge reinforcement of the front wall 52
60 roof structure
61a truss the roof structure 60
61b truss the roof structure 60
62a B-pillar element of the roof structure 60
62b B-pillar element of the roof structure 60
63a transverse member of the roof structure 60
63b transverse member of the roof structure 60
64 roof area element
70a structural supporting member, side member
70b structural supporting member, side member

The invention claimed is:

1. A body supporting structure for a vehicle body, comprising:
a passenger compartment section, a front-structure section and a rear-structure section,
at least one structural supporting member constructed as a three-dimensional flat structure formed of flat elements and extending in three orthogonal vehicle directions, a longitudinal vehicle direction, a transverse vehicle direction and a vertical vehicle direction, wherein the flat elements extending in different orthogonal vehicle directions are interconnected by smooth transitions and are formed with cross-sectional areas structured in dependence of applied loads such that the flat elements with low applied loads or non-loadbearing areas are designed with openings, and
a floor assembly comprising a common trough-shaped subfloor for the passenger compartment section, wherein the front-structure section comprises a trough bottom and trough side members that are connected with the trough bottom as a single piece, wherein the trough bottom is recessed in the region of the front-structure section symmetrically relative to the region of the passenger compartment section with a smaller width in the transverse vehicle direction, and wherein the trough side members encircle an entire horizontal contour of the trough bottom and extend substantially in the vertical vehicle direction.

2. The body supporting structure of claim 1, wherein the trough side members of the passenger compartment section extending in the longitudinal vehicle direction are formed in the vertical vehicle direction at a rocker panel height of the vehicle body.

3. The body supporting structure of claim 2, wherein the trough side members located in a region of the front-structure section are higher in the vertical vehicle direction in relation to the rocker panel height.

4. The body supporting structure of claim 2, wherein the trough bottom comprises a raised portion connected with the trough side members in a transition region between the passenger compartment section and the front-structure section, with the raised portion having a cross-sectional area in the transverse vehicle direction that is greater than a cross-sectional area of the trough bottom in a region of the passenger compartment section.

5. The body supporting structure of claim 2, wherein the trough bottom in a region of the front-structure section is formed with an obtuse angle of at least 135° relative to the trough bottom in a region of the passenger compartment section.

6. The body supporting structure of claim 2, wherein the front-structure trough side member has in the transverse vehicle direction at least one opening for supply of cooling air.

7. The body supporting structure of claim 2, wherein the trough side members extending in the longitudinal vehicle direction have in a region of the front-structure section openings for receiving front axles.

8. The body supporting structure of claim 2,
wherein the front-structure section comprises as a structural supporting member a front-structure cell having two front-structure side members, which are each oriented in the vertical vehicle direction and extend in the longitudinal vehicle direction from an end region of the passenger compartment section of the contour of the trough side members to the trough side member that runs in the transverse vehicle direction, and which are each constructed with a lower A-pillar section at a front end of the passenger compartment section, and
wherein a flat element connecting the front-structure side members is provided as an end wall at a transition from the passenger compartment to the front-structure section.

9. The body supporting structure of claim 8, wherein the two front-structure side members of the front-structure cell are each formed so as to transition at their upper end to a respective front-structure flat element extending in the longitudinal vehicle direction and in the transverse vehicle direction, wherein for forming a wheel housing an outer boundary edge of the front-structure flat element is aligned with a contour of the trough side member in the region of the passenger compartment section.

10. The body supporting structure of claim 9, wherein the respective front-structure flat elements are formed so as to transition into each other in a region of the flat element forming an end wall at a transition from the passenger compartment to the front-structure section.

11. The body supporting structure claim 9, wherein the front-structure cell is provided at its front end on both sides in each case with an open receiving chamber, wherein the front-structure side members and the front-structure flat elements each form a side wall of the receiving chamber.

12. The body supporting structure of claim 1, wherein for supporting a backseat, a seat element extending substantially in a horizontal direction is molded to the rear trough side member of the passenger compartment section extending in the transverse vehicle direction, with the seat element being connected with a flat seatback element extending substantially in the vertical vehicle direction.

13. The body supporting structure of claim 12, wherein the seat element and the flat seatback element have an angular position relative to each other with an angle that substantially corresponds to an angle between the seat element and a backrest of the backseat.

14. The body supporting structure of claim 1, wherein the trough-shaped subfloor is extended in a rearward direction, starting from the rear trough side member, by way of side tunnels comprising outside tunnel walls aligned with a respective trough side member in the region of the passenger compartment section.

15. The body supporting structure of claim 14, wherein the side tunnels comprise a bottom tunnel wall that is substantially aligned with the trough bottom.

16. The body supporting structure of claim 14, wherein the side tunnels comprise an upper tunnel wall that is substantially aligned with a seat element of the rear trough side member of the trough bottom.

17. The body supporting structure of claim 14, wherein the side tunnels are formed so that their end faces terminate in a plane of the rear trough side member.

18. The body supporting structure of claim 14, wherein inside tunnel side walls of the side tunnels are aligned in the vertical vehicle direction and are formed so as to arrange the rear trough side member in form of a grid-like pattern.

19. The body supporting structure of claim 14, wherein the rear-structure section comprises a supporting structural member in form of a subfloor rear member, the subfloor rear member comprising a bottom part rearwardly extending the trough bottom in the region of the passenger compartment section and side members which are adapted in a step-like manner to an outer shape of the side tunnels in the transverse vehicle direction.

20. The body supporting structure of claim 19, wherein the side members of the subfloor rear member are each formed so as to transition into a flat element forming a wheel housing inner wall.

21. The body supporting structure of claim 1, wherein the rear-structure section comprises a storage space cell forming a further structural supporting member, the storage space cell comprising a storage space cell bottom having storage space cell side walls molded thereon and a molded end wall.

22. The body supporting structure of claim 21, wherein the end wall of the storage space cell is aligned with a flat seatback element.

23. The body supporting structure of claim 21, further comprising a roof structure comprising trusses connecting a lower A-pillar section in an arcuate manner with the end wall of the storage space cell, and a B-pillar element connecting the trusses with the trough side member of the trough bottom.

24. The body supporting structure of claim 23, further comprising two spaced-apart transverse members connecting the trusses in the transverse vehicle direction, and a roof area element received between the transverse members.

25. The body supporting structure of claim 23, further comprising a side member covering an exterior of the lower A-pillar section, the trusses, the B-pillar element and a storage space cell side wall of a storage space cell.

* * * * *